US008276175B2

(12) United States Patent
Jeon et al.

(10) Patent No.: US 8,276,175 B2
(45) Date of Patent: Sep. 25, 2012

(54) METHOD AND DVB-H RECEPTION TERMINAL FOR RECEIVING ESG DATA BASED ON A SESSION PARTITIONING RULE

(75) Inventors: Jin-Woo Jeon, Seongnam-si (KR); Young-Jip Kim, Suwon-si (KR); Jae-Yeon Song, Seoul (KR); Young-Seop Han, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 660 days.

(21) Appl. No.: 11/866,203

(22) Filed: Oct. 2, 2007

(65) Prior Publication Data

US 2008/0083006 A1 Apr. 3, 2008

(30) Foreign Application Priority Data

Oct. 2, 2006 (KR) ........................ 10-2006-0097354
Oct. 16, 2006 (KR) ........................ 10-2006-0100354

(51) Int. Cl.
*H04N 5/445* (2011.01)

(52) U.S. Cl. ........................ 725/37; 39/44; 39/50; 39/54

(58) Field of Classification Search .................... 725/37, 725/39, 44, 50, 54
See application file for complete search history.

(56) References Cited

U.S. PATENT DOCUMENTS 7,614,068 B2 * 11/2009 Jansky ............................ 725/54
2006/0053450 A1 3/2006 Saarikivi et al.
2006/0123099 A1 6/2006 Paila et al.
2007/0053291 A1 * 3/2007 Hiltunen et al. .............. 370/233
2007/0100984 A1 * 5/2007 Jansky et al. ................. 709/223
2008/0101317 A1 * 5/2008 Bouazizi ....................... 370/342

FOREIGN PATENT DOCUMENTS

KR 1020060067849 6/2006
KR 1020070030054 3/2007
WO WO 2005/002151 1/2005
WO WO 2005/022791 3/2005

OTHER PUBLICATIONS

DVB Organization: "ESG Guidelines", Draft ETSI TR 1XX XXX V0.0.12, Digital Video Broadcasting, Sep. 20, 2006.

* cited by examiner

*Primary Examiner* — Nasser Goodarzi
*Assistant Examiner* — Jivka Rabovianski
(74) *Attorney, Agent, or Firm* — The Farrell Law Firm, P.C.

(57) ABSTRACT

A method is disclosed for efficiently receiving Electronic Service Guide (ESG) data for a Digital Video Broadcasting-Handheld (DVB-H) broadcast service in a DVB-H reception terminal. When ESG data to which session partitioning rules are applied is received in a multiple-stream mode, session-by-session rules are detected. On the basis of the rules, sessions in which actual ESG data is carried are classified by roles required to provide the broadcast service. The associated ESG data from the sessions is acquired and stored. Since ESG data can be efficiently received by providing detailed guidelines for receiving the ESG data based on a session partitioning rule, a reception scheme of the DVB-H reception terminal can be significantly improved.

23 Claims, 7 Drawing Sheets

| Ref. | Syntax | No. of Bits | Mnemonic |
|---|---|---|---|
| | ESG Session Partition Declaration{ | | |
| | nm_fields | 8 | uimsbf |
| 100 | overlapping | 1 | bslbf |
| | Reserved | 7 | bslbf |
| | for(k=0: k<num_fields: k++){ | | |
| 105 | field_identifier[k] | 16 | bslbf |
| | field_encoding[k] | 16 | bslbf |
| 110 | field_length[k] | 8 | uimsbf |
| | } | | |
| | n_o_IPStreams | 8 | uimsbf |
| | IPVersion6 | 1 | bslbf |
| | Reserved | 7 | bslbf |
| | for(i=0; i<n_o_IPStreams; i++){ | | |
| | IPStreamID[i] | 8 | uimsbf |
| | if(IPVersion6){ | | |
| | ESGSourceAddress[i] | 128 | bslbf |
| | IPAddress[i] | 128 | bslbf |
| | }else{ | | |
| | ESGSourceAddress[i] | 32 | bslbf |
| | IPAddress[i] | 32 | bslbf |
| | } | | |
| | Port[i] | 16 | uimsbf |
| | SessionID[i] | 16 | uimsbf |
| | for(k=0, k<num_fields; k++) { | | |
| | if(field_length[k]==0){ | | |
| 120 | length[i][k] | 8+ | vluimsbf8 |
| | } | | |
| 130 | if(overlapping){ | | |
| | start_field_value[i][k] | | bslbf |
| | } | | |
| | end_field_value[i][k] | | bslbf |
| | nextByteBoundary() | | |
| | } | | |
| | } | | |

FIG.4

METHOD AND DVB-H RECEPTION TERMINAL FOR RECEIVING ESG DATA BASED ON A SESSION PARTITIONING RULE

PRIORITY

This application claims priority under 35 U.S.C. §119(a) to a Korean Patent Application filed in the Korean Intellectual Property Office on Oct. 2, 2006 and assigned Serial No. 2006-97354, and to a Korean Patent Application filed in the Korean Intellectual Property Office on Oct. 16, 2006 and assigned Serial No. 2006-100354, the entire disclosures of each of which are incorporated herein by reference.

BACKGROUND OF THE INVENTION

1. Field of the Invention

The present invention generally relates to a Digital Video Broadcasting-Handheld (DVB-H) reception terminal, and more particularly to a method and DVB-H reception terminal for efficiently receiving broadcasting data.

2. Description of the Related Art

DVB-H is a technical standard established to improve the reception rate of mobile terrestrial Digital Television (TDV) in Europe. The DVB-H technology can implement mobile multimedia broadcasting that provides high-quality voice and video services anytime and anywhere, even when users are driving or walking.

Using this DVB-H technology, a service model has the following structure. First, a transmitting stage is constructed with a network interactive with a broadcast provider and a communication provider according to DVB-Universal Mobile Telecommunications Service (UMTS) standard. The broadcast provider provides a terminal with compressed data in a DVB-H transmission scheme on the basis of a DVB-Audio Visual Content (AVC) standard. The terminal communicates with a mobile communication provider in a communication standard such as DVB-UMTS/Global System for Mobile communications (GSM), and also provides the broadcast provider with information regarding a receiving side through a communication network in real time.

On the other hand, broadcast related information is mostly included in an Electronic Service Guide (ESG) in a DVB-H system. A user may select a TV channel or a radio channel of interest through the ESG or may select an item to be downloaded. The ESG provides information for connecting the terminal to a specific Internet Protocol (IP) stream within a DVB-H transport stream. An operation for processing ESG data is divided into three processes.

Specifically, the three processes are classified into an ESG bootstrapping process in which the terminal detects types of ESG data capable of being received and detects how to acquire ESG data, an ESG acquisition process in which the terminal collects and processes ESG data, and an ESG update process in which the terminal stores a latest version of ESG data.

The DVB-H ESG standard supports a single-stream mode and a multiple-stream mode when ESG data is transmitted. Thus, the DVB-H ESG standard defines a structure of a session partitioning rule such that ESG data can be transmitted by applying rules on a session-by-session basis in the multiple-stream mode. However, since detailed guidelines are not provided for ESG data reception based on a session partitioning rule, confusion may occur when a DVB-H reception terminal receives ESG data to which the session partitioning rule is applied.

SUMMARY OF THE INVENTION

When Electronic Service Guide (ESG) data is transmitted in a multiple-stream mode, a structure of an available session partitioning rule applied to a session is defined in a conventional Digital Video Broadcasting-Handheld (DVB-H) ESG standard as described above. However, significant confusion may be caused by the lack of guidelines for each rule in a DVB-H reception terminal for receiving ESG data to which the session partitioning rule is actually applied. In particular, as the amount of ESG data increases, the data processing time of the DVB-H reception terminal increases. Thus, an operation based on the session partitioning rule needs to be established.

An aspect of exemplary embodiments of the present invention is to address at least the above problems and/or disadvantages and to provide at least the advantages described below. Accordingly, an aspect of exemplary embodiments of the present invention is to provide a method and DVB-H reception terminal for receiving ESG data based on a session partitioning rule in which operation criteria for the DVB-H reception terminal can be provided upon reception of the ESG data to which the session partitioning rule is applied.

An aspect of exemplary embodiments of the present invention is to provide a method and DVB-H reception terminal for receiving ESG data based on a session partitioning rule that can minimize confusion occurring when the ESG data to which the session partitioning rule is applied is received.

In accordance with an aspect of exemplary embodiments of the present invention, there is provided a method for receiving ESG data based on a session partitioning rule in a DVB-H reception terminal, the method including determining whether a partitioning rule is applied to each ESG data session received from a DVB-H transmission server in a multiple-stream mode; detecting the type of rule applied to each session upon determining that the partitioning rule is applied; and acquiring ESG data from each session based on the detected rule.

In accordance with an aspect of exemplary embodiments of the present invention, there is provided a DVB-H reception terminal for receiving ESG data based on a session partitioning rule, the terminal including a digital broadcasting receiver for receiving each ESG data session from a DVB-H transmission server in a multiple-stream mode; and a controller for determining whether a partitioning rule is applied to each session received by the digital broadcasting receiver, detecting the type of rule applied to each session upon determining that the partitioning rule is applied, and acquiring ESG data from each session based on the detected rule.

BRIEF DESCRIPTION OF THE DRAWINGS

The above and other features and advantages of the present invention will be more apparent from the following detailed description taken in conjunction with the accompanying drawings, in which:

FIG. 4 illustrates the syntax of a partition declaration within an ESG initial container in accordance with an exemplary embodiment of the present invention;

DETAILED DESCRIPTION OF THE PREFERRED EMBODIMENTS

Figure 1:
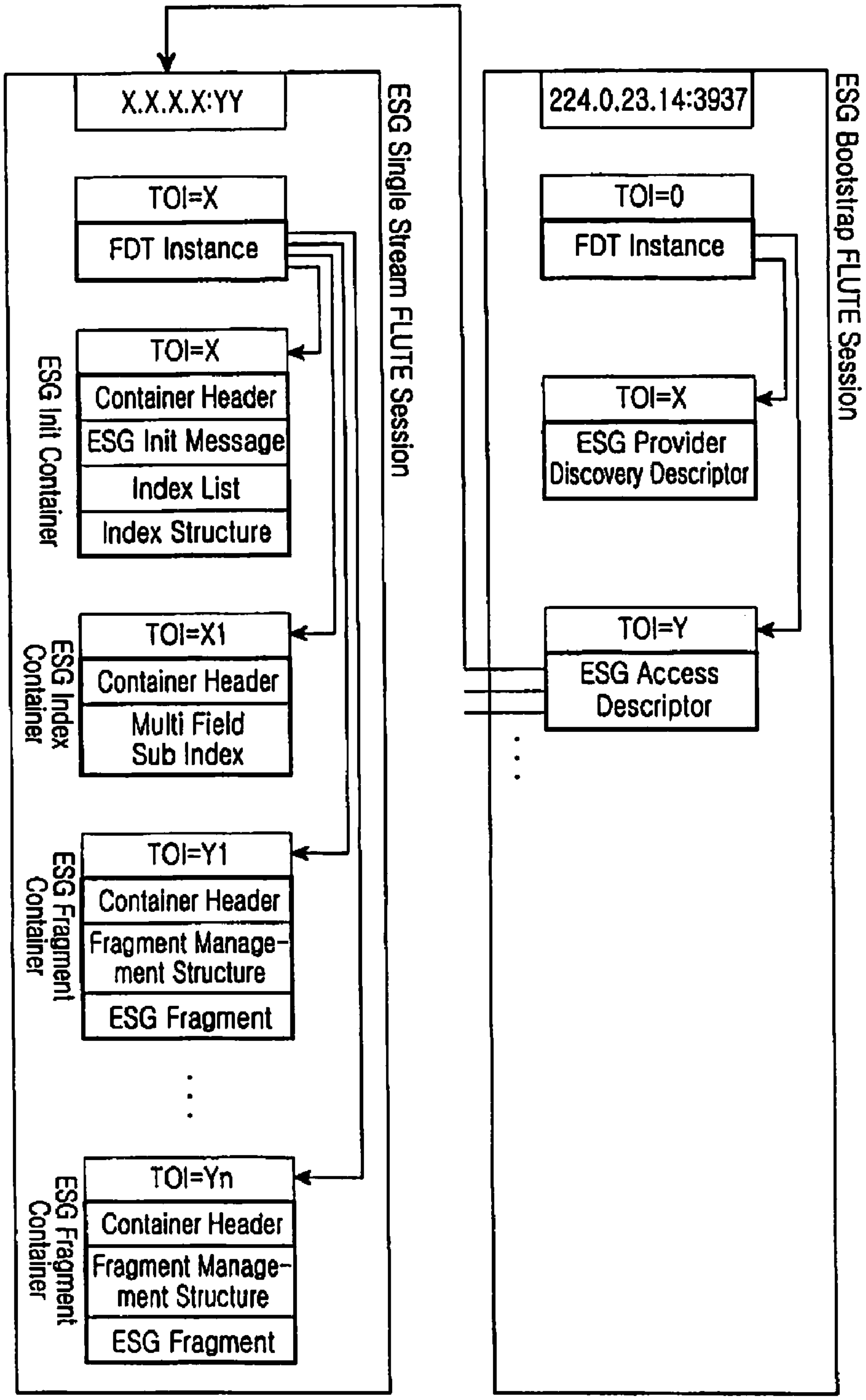
FIG. 1 is a block diagram illustrating an Electronic Service Guide (ESG) single-stream transport mode in accordance with an exemplary embodiment of the present invention.

Exemplary embodiments of the present invention will be described in detail herein below with reference to the accompanying drawings. In the drawings, the same or similar elements are denoted by the same reference numerals even though they are depicted in different drawings. The matters defined in the description such as a detailed construction and elements are provided to assist in a comprehensive understanding of exemplary embodiments of the invention. Also, descriptions of well-known functions and constructions are omitted for clarity and conciseness.

The present invention provides a method for efficiently receiving Electronic Service Guide (ESG) data for a Digital Video Broadcasting-Handheld (DVB-H) broadcast service in a DVB-H reception terminal. In exemplary embodiments of the present invention, session-by-session rules are detected when ESG data, to which session partitioning rules are applied, is received in a multiple-stream mode. On the basis of the rules, sessions in which actual ESG data is carried are classified by roles required to provide the broadcast service. The associated ESG data from the sessions is acquired and stored. In exemplary embodiments of the present invention, a reception scheme of the DVB-H reception terminal can be significantly improved since ESG data can be efficiently received by providing detailed guidelines for receiving the ESG data based on a session partitioning rule.

For convenience of explanation, an ESG transmission structure in a DVB-H system will be described. Then, an operation of the DVB-H reception terminal for receiving ESG data to which a session partitioning rule is applied in accordance with exemplary embodiments of the present invention will be described.

Upon receiving an ESG stream, the DVB-H reception terminal acquires information required to receive a service from a DVB-H transmission server, that is, a service provider. When a user selects a specific service, the terminal receives data after accessing a data stream in which the service is provided using the acquired information. Information for accessing a service data stream from the DVB-H reception terminal is transmitted in an ESG fragment.

Several ESG data models are tied on a fragment-by-fragment basis and are contained in one container. The container is transmitted, and is regarded as one object in a File Delivery over Unidirectional Transport (FLUTE) session, that is, a data session.

First, an ESG single-stream transport mode will be described. In the ESG single-stream transport mode, the ESG container is transmitted in a single FLUTE session, as illustrated in FIG. 1. This session can be retrieved using an ESG access descriptor transmitted in an ESG bootstrap session or bootstrap FLUTE session.

Figure 2:
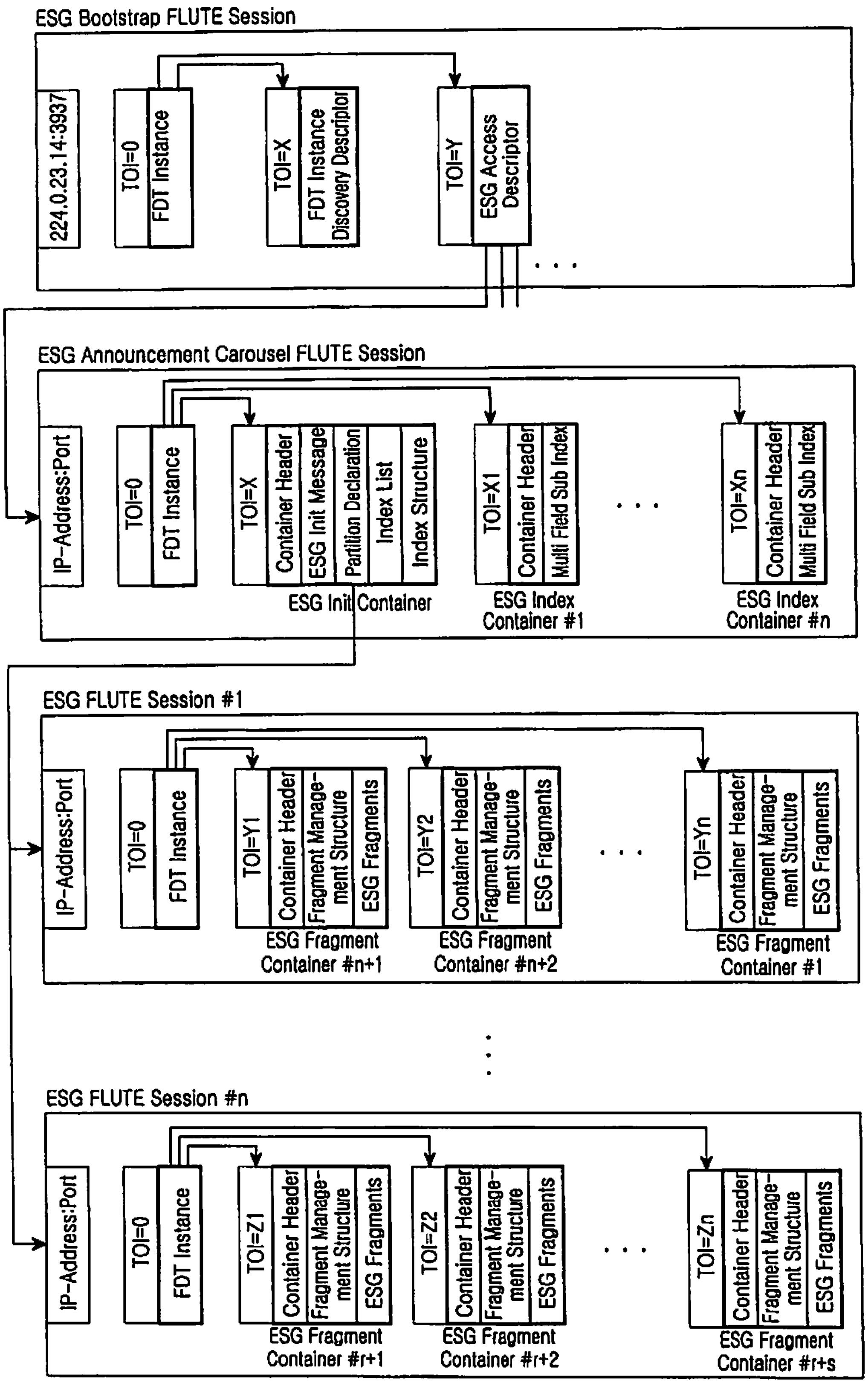
FIG. 2 is a block diagram illustrating an ESG multiple-stream transport mode in accordance with an exemplary embodiment of the present invention.

On the other hand, in an ESG multiple-stream transport mode, ESG containers are transmitted in at least three sessions, as illustrated in FIG. 2. The ESG bootstrap session indicates an ESG Announcement Carousel FLUTE session that gives notification of session information and the number of sessions in which actual ESG containers are transmitted.

Referring to FIG. 2, the DVB-H transmission server reports channel information of an ESG bootstrap session for transmitting ESG data, that is, a path, to the DVB-H reception terminal. When accessing a channel based on the channel information, the terminal receives bootstrap information. The bootstrap information is configured with an ESG provider descriptor and an ESG access descriptor. In the ESG provider descriptor, information regarding an Identifier (ID), name and logo of an ESG provider and the like is transported. In the ESG access descriptor, information regarding ESG Announcement Carousel, IP addresses and the number of IP sessions in which an ESG is transmitted is transported.

In the ESG Announcement Carousel, ESG Init Container and ESG Index Containers are transported. The ESG Init Container contains an option of a decoder for decoding an ESG, Partition declaration, Index List and Index Structure. When the ESG is transported in a number of sessions, the Partition Declaration within the Init Container includes session-by-session partition criterion information and session-by-session channel information. The Index List and Index Structure include mapping information between ESG fragments to be transmitted and containers. In FIGS. 1 and 2, an ESG FLUTE session is an ESG data session.

ESG data has broadcast service information and is transmitted to the DVB-H reception terminal using a special IP stream at a time different from that of an actual data stream. Thus, the DVB-H transmission server can provide the user with information to be known in advance, before a service is transmitted or before the user receives the service using an ESG model. Upon receiving this ESG model, the DVB-H reception terminal acquires mandatory information required to receive the service from the DVB-H transmission server. When the user selects a specific service, the DVB-H reception terminal receives data after accessing a data stream in which the service is provided using the acquired information.

Next, described below are exemplary embodiments of the present invention that are classified as follows. In a first exemplary embodiment of the present invention, the DVB-H reception terminal performs a process for acquiring ESG data by reading a valid period designated in each session in which the ESG data is carried. In a second exemplary embodiment of the present invention, the DVB-H reception terminal performs a process for acquiring service-by-service ESG data by reading a service Uniform Resource Identifier (URI) designated in a session in which the ESG data is carried. In a third exemplary embodiment of the present invention, the DVB-H reception terminal performs an update to ESG data acquired from a session at a dateTime by reading the dateTime set in the session in which the ESG data is carried.

Figure 3:
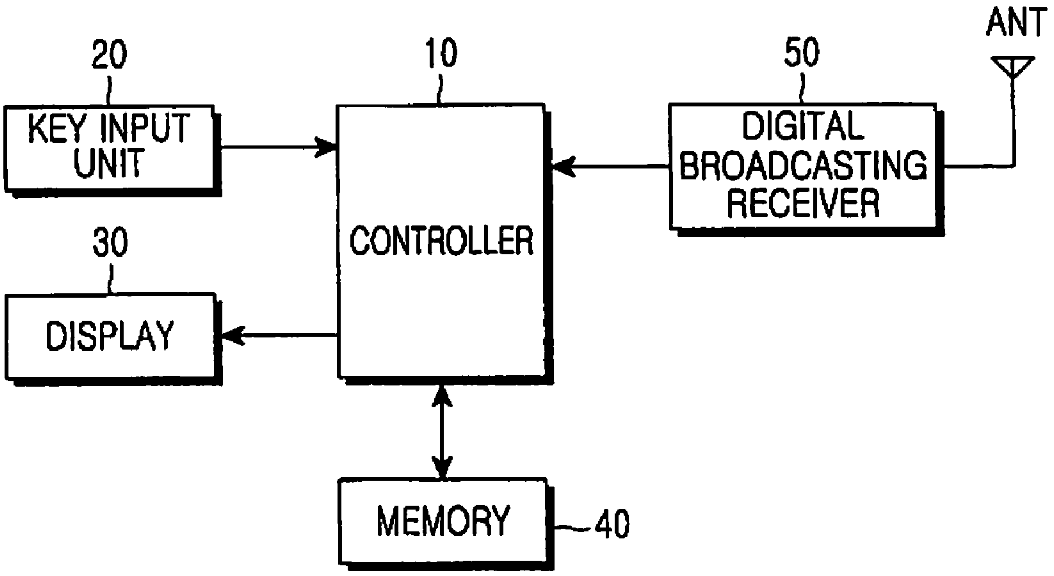
FIG. 3 is an internal block diagram illustrating a Digital Video Broadcasting-Handheld (DVB-H) reception terminal in accordance with an exemplary embodiment of the present invention.

The components of the DVB-H reception terminal and their operations will be described with reference to FIG. 3. Referring to FIG. 3, the DVB-H reception terminal is provided with a controller 10, a key input unit 20, a display 30, a memory 40 and a digital broadcasting receiver 50.

First, the digital broadcasting receiver 50 receives a transport stream from a service provider, that is, a DVB-H transmission server, through a DVB-H network and then outputs the received transport stream to the controller 10. An operation for parsing video and audio data through a decoding process after demultiplexing the transport packet is implemented inside the controller 10. Since those skilled in the art are familiar with the operations of the internally implemented components, a detailed description is omitted.

On the other hand, the controller 10 processes voice signals and data according to protocol for wireless Internet access and digital broadcasting, as well as controls the components of the DVB-H reception terminal. In accordance with an exemplary embodiment of the present invention, the controller 10 receives an ESG bootstrap session through the digital broadcasting receiver 50 when the user executes a broadcast service through the key input unit 20. Upon receiving the ESG bootstrap session, the controller 10 analyzes the ESG bootstrap session. In the single-stream mode, the controller 10 retrieves the associated session and receives all ESG data. In the multi-stream mode, the controller 10 decodes an announcement carousel. Specifically, an ESG data transmission starts when the ESG bootstrap session is received. The bootstrap session includes an ESG provider descriptor and an ESG access descriptor. The ESG access descriptor has information of the announcement carousel session. When the Init Container is received by detecting the announcement carousel session, Partition Declaration information is included in the Init Container. In an exemplary embodiment of the present invention, the controller 10 can detect rules applied to sessions in which actual ESG data is transmitted by reading the Partition Declaration information.

The controller 10 detects rules applied to sessions according to whether a compound rule or a rule of at least one of, for example, a designated valid period, ServiceURI and dateTime, is applied. According to applied rules, the controller 10 controls an operation for acquiring ESG data from the associated data session and storing the acquired ESG data in the memory 40. The controller 10 displays a channel list based on currently acquired ESG data on the display 30. ESG data to be applied at a predefined dateTime is stored in a special area of the memory 40.

The controller 10 receives a key input from the user through the key input unit 20 and sets a channel. The controller 10 controls the display 30 to provide a broadcast service based on the key input of the user.

Under control of the controller 10, the display 30 receives display data mapped to key input data from the key input unit 20 and then displays the received data. The display 30 allows the user to visually detect a state in which a required function is set or enabled. Moreover, the display 30 displays a DVB-H broadcast service under the control of the controller 10.

The memory 40 stores information related to the overall functions of the DVB-H reception terminal and also stores information related to broadcast service provision, for example, ESG data. A special area for storing ESG data to be applied at a dateTime designated by the DVB-H transmission server is assigned to the memory 40. That is, ESG data stored in a special storage space is updated in the memory area in which existing ESG data is stored only when the designated dateTime is reached.

Next, an operation for receiving ESG data to which a session partitioning rule is applied in the DVB-H reception terminal with the above-described structure is described. At this time, the DVB-H reception terminal acquires ESG data based on a partition declaration defined as illustrated in FIG. 4.

FIG. 4 illustrates the syntax of a partition declaration within an ESG initial container in accordance with an exemplary embodiment of the present invention. Referring to FIG. 4, an overlapping field 100 is constructed with one bit. When set to '1' signals that identifies if the partitions are overlapping according to the value ranges of the identified fields. Otherwise, the overlapping field 100 is set to zero (0). As indicated by reference numeral 110, field_length[k] is constructed with 4 bytes and indicates a length value of a field indicating a specific rule. If the "field_length[k]" value 110 is a variable value, for example, a "0x00" value, a "length[i][k]" value of a field 120 is set to a length value of an actual field.

On the other hand, when a rule is not applied to any one of multiple sessions currently being transmitted, the "field_length[k]" value 110 and the "length[i][k]" value can be unconditionally set to zero such that a determination can be made as to whether the associated rule is applied to each session. If the "length[i][k]" value is zero, the DVB-H reception terminal can easily determine that a rule is not applied to the associated session without checking an additional condition. If the "length[i][k]" value is zero, it means that the length of a field indicating a specific rule is zero. In this case, the DVB-H reception terminal can determine that a specific rule is not applied to a session upon reception of the session.

However, if the "field_length[k]" value 110 is a fixed value, for example, a value different from the "0x00" value, a determination is made as to whether a specific rule of each session is applied according to value of the overlapping field 100. For example, it is determined whether a valid period field with time information regarding a valid period of ESG data, as indicated by reference numeral 130, is activated according to value set to the overlapping field 100. Specifically, according to a value set to the overlapping field 100, the valid period field 130 has both "start_field_value" and "end_field_value" or only "end_field_value". The DVB-H reception terminal compares "start_field_value" and "end_field_value" and then determines whether the associated rule is applied.

For example, if the overlapping field 100 is set to one, the DVB-H reception terminal compares "start_field_value" of a current session automatically estimated from "end_field_value" of a previous session and "end_field_value" of the current session, and determines whether the values are the same as each other. If the overlapping field 100 is set to zero, the DVB-H reception terminal determines whether a specific rule is applied to the associated session by determining whether "start_field_value" and "end_field_value" of the current session are the same.

In another embodiment of the present invention, when the "field_length [k]" value 110 corresponding to a length value of a field indicating that a specific rule is fixed, "start_field_value" and "end_field_value" are assigned as predefined bit strings irrespective of a relation with a previous session, that is, a value of the overlapping field 100, and allow the DVB-H reception terminal to determine whether the rule of the associated session is used. For example, a valid period (Number of Hours) rule and a ServiceURI rule can be present in the current DVB-CBMS phase-I ESG spec. If only the valid period rule is used in a specific IP stream, a ServiceURI is used for a total range in an associated session. If only the ServiceURI rule is used, a valid period is used for a service of a total time related to an ESG in an associated session. At this time, a minimum value of "start_field_value" and a maximum value of "end_field_value" in the ServiceURI can be assigned as specific bit strings. The minimum value can be set to "0x00" or "a" as a form of string. The maximum value can be set to "0xFF" or "z" as a form of string. Values assigned to the minimum and maximum values are not actual minimum and maximum values in an associated session, but are specific bit strings indicating the minimum value of mathematical meaning and the maximum value representing infinity in a data type of an associated rule. That is, the maximum value is the same as that of an ESG of one month, even when service information of one week is present in the associated ESG. In this exemplary embodiment, bit strings representing different minimum and maximum values should be predefined between rules or data types.

Alternatively, "start_field_value" and "end_field_value" can be assigned as specific bit strings irrespective of a variable or fixed length value of a field indicating a specific rule. For this, the specific bit strings should be predefined between a terminal and a network as described above. For example, a valid period rule and a ServiceURI rule can be present as in the current DVB-CBMS phase-I ESG spec. If only the valid period rule is used in a specific IP stream, a ServiceURI is used for a total range in an associated session. If only the ServiceURI rule is used, a valid period is used for a service of a total time related to an ESG in an associated session. At this time, a minimum value of "start_field_value" and a maximum value of "end_field_value" in the ServiceURI can be assigned as specific bit strings. In the case of "0x00" or a string, the minimum value can be set to "a" or the like. In the case of "0xFF" or a string, the maximum value can be set to "z" or the like. Values assigned to the minimum and maximum values are not actual minimum and maximum values in an associated session, but are specific bit strings indicating the minimum value of mathematical meaning and the maximum value representing infinity in a data type of an associated rule. That is, the maximum value is the same as that of an ESG of one month, even when service information of one week is present in the associated ESG. In this exemplary embodiment, bit strings representing different minimum and maximum values should be predefined between rules or data types.

When a rule, for example, a compound rule of a valid period, a ServiceURI and a dateTime, is applied to each session, the DVB-H reception terminal determines whether a specific rule is applied to each session in order to process ESG data since specific rule may not apply to a specific session.

Upon receiving the session to which the specific rule is applied, the DVB-H reception terminal detects a type of the actually applied rule by reading a value of a "field_identifier [k]" field 105. A type of rule based on a value set to the "field_identifier[k]" field 105 can be expressed as shown in Table 1.

TABLE 1

| Value | Encoding | Meaning |
|---|---|---|
| 0x00 | 0x0101 (unsigned short) | The number of hours for which the fragments are valid. This may be used to split the ESG into various schedule depths. |
| 0x01 | 0x0000 (string) | The URI of the Service fragments ServiceId. This may be used to carry all fragments relevant to a particular service. |
| 0x02-0xEF | | DVB Reserved |
| 0xF0-FE | | User Defined |
| 0Xef | | Reserved |

Table 1 shows a type of rule defined in a DVB-H ESG standard. A desired partitioning rule can be applied by changing a value set to the "field_identifier [k]" field 105.

Next, an operation for receiving ESG data to which a session partitioning rule is applied in the DVB-H reception terminal based on a partition declaration as illustrated in FIG. 4 will be described.

A process in which the DVB-H reception terminal acquires ESG data by detecting a valid period designated in a session in which ESG data is carried in accordance with the first exemplary embodiment of the present invention will be described with reference to FIG. 5, which is a flowchart illustrating an operation of the DVB-H reception terminal when a valid period rule is applied in accordance with the first exemplary embodiment of the present invention.

Figure 5:
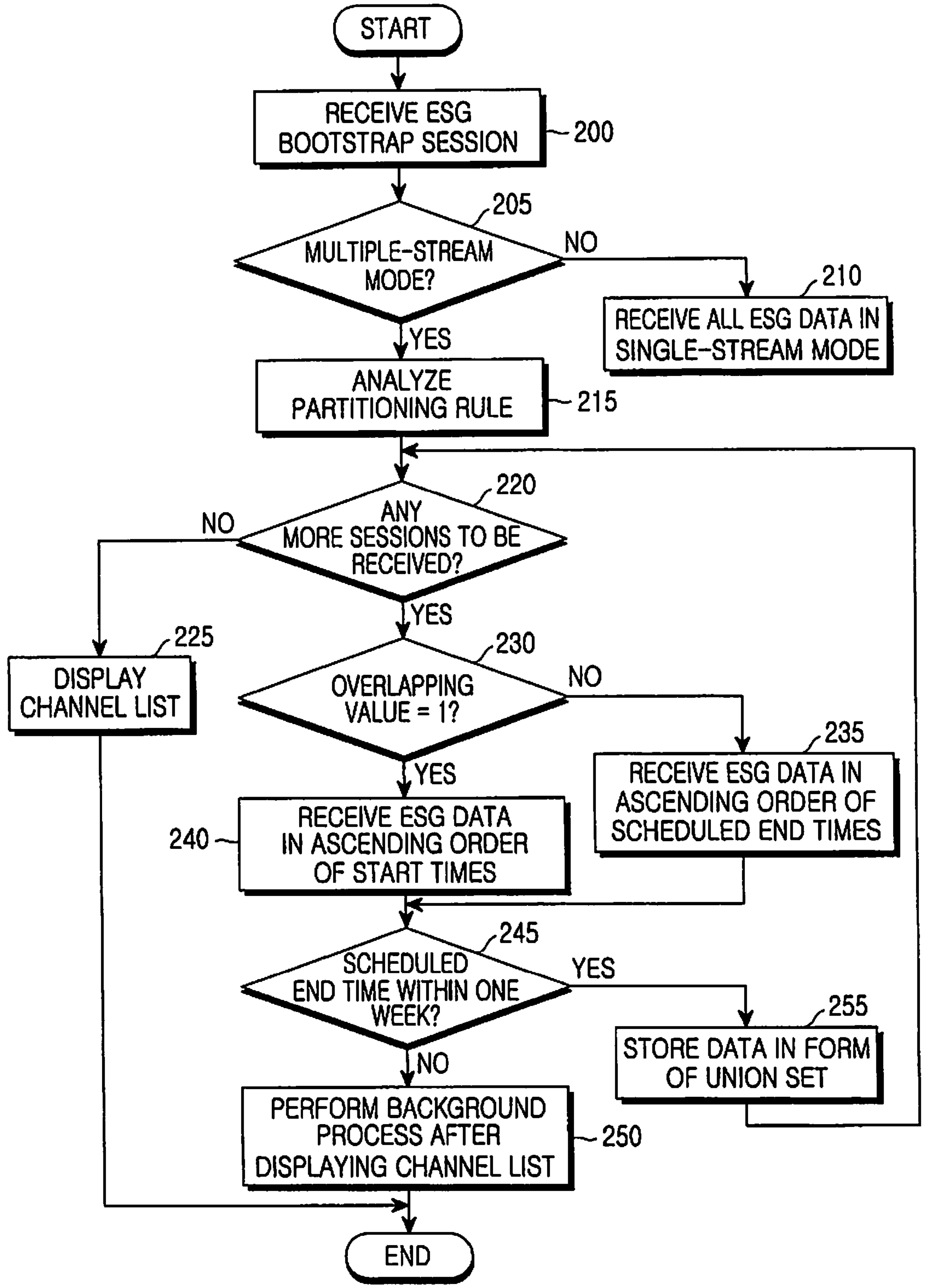
FIG. 5 is a flowchart illustrating an operation of the DVB-H reception terminal when a valid period rule is applied in accordance with a first exemplary embodiment of the present invention.

Referring to FIG. 5, the DVB-H reception terminal receives an ESG bootstrap session when the user executes a broadcast service in step 200. Upon receiving the ESG bootstrap session, the DVB-H reception terminal analyzes the ESG bootstrap session and determines whether an operating mode is a multiple-stream mode in step 205. If the operating mode is not the multiple-stream mode, the terminal determines that the operating mode is a single-stream mode, retrieves an associated session and receives all ESG data in step 210. If the operating mode is the multiple-stream mode, the terminal analyzes a partitioning rule in step 215. Specifically, an ESG data transmission starts when the ESG bootstrap session is received. The bootstrap session includes an ESG provider descriptor and an ESG access descriptor. The ESG access descriptor has information of the announcement carousel session. When the Init Container is received by detecting the announcement carousel session, Partition Declaration information is included in the Init Container. In an exemplary embodiment of the present invention, the terminal can detect rules applied to sessions in which actual ESG data is transmitted using the Partition Declaration information.

The DVB-H reception terminal determines whether a valid period rule is applied by analyzing the partitioning rule in step 215. At this time, the DVB-H reception terminal determines that the valid period rule is applied if a "0x00" value corresponding to the first value of Table 1 is set in the "field_identifier[k]" field 105 of FIG. 4. In FIG. 5, illustrating a data processing operation when the valid period rule is applied, it is assumed that the valid period rule is already applied. That is, the DVB-H reception terminal detects a state in which the valid period rule is applied through a partitioning rule analysis process.

The DVB-H reception terminal can acquire information regarding each session by analyzing the partition declaration, as described above. Thus, the DVB-H reception terminal retrieves each session by determining whether there are any more sessions to be received in step 220. When there are no more sessions to be received, the DVB-H reception terminal proceeds to step 225 to construct and display a channel list based on ESG data acquired through sessions received up to now.

However, upon determining that there are more sessions to be received in step 220, the DVB-H reception terminal proceeds to step 230 to determine whether a value of the overlapping field 100 is set to one from the partition declaration of FIG. 4. Upon determining that the value of the overlapping field 100 is not set to one, the DVB-H reception terminal receives data in ascending order of scheduled end times in step 235. That is, the DVB-H reception terminal reads only end_field_value indicating a scheduled end time of the valid period field and acquires ESG data by accessing a session in ascending order of end_field_value.

If the value of the overlapping field 100 is set to one, the DVB-H reception terminal receives ESG data in ascending order of start times in step 240. That is, the DVB-H reception terminal reads start_field_value indicating a start time of the valid period field 130 and acquires ESG data by accessing a session in ascending order of start_field_value.

At this time, the DVB-H reception terminal determines whether the scheduled end time is within one week in step 245. This determination is made to first receive only optimal data required for a broadcast service and display the received data. When the scheduled end time is more than one week, the DVB-H reception terminal receives the remaining ESG data in a background process after displaying a channel list based on the acquired ESG data in step 250. To minimize a start time of the broadcast service, that is, a waiting time until the user starts the broadcast service, the terminal performs the background process when receiving session data mapped to the scheduled end time after a predefined period, for example, one week. In an exemplary embodiment of the present invention, a period of optimal data required to provide the broadcast service is set to one week. Of course, a reference time can differ according to the DVB-H reception terminal.

When the scheduled end time is determined to be within one week in step 245, the DVB-H reception terminal stores data in the form of a union set in step 255 and then returns to step 220 to determine whether there are any more sessions to be received. An operation according to the determination result is the same as described above. Next, a process for storing data in the form of a union set will be described in detail.

When there is information of already stored data with an ID equal to that of ESG fragment data received in a new session, the DVB-H reception terminal can re-configure a union set of data of two fragments in the following sequence.

First, when an ID of a new fragment to be stored is equal to that of an already stored fragment, the new fragment is not stored if a version of the new fragment is determined to be lower in a comparison between versions.

Second, when the version of the new fragment to be stored is higher, an old fragment is deleted and replaced with the new fragment.

Third, when the versions of two fragments are the same, a comparison is performed between the element units and attribute units of the fragments. When new element and attribute data is present, the associated data is stored. That is, a union set of two fragments is configured.

When the versions of two fragments are the same, it is determined whether rules used in respective sessions have a profile form in which one fragment is divided and transmitted. If the fragments are transmitted in the profile form, the union set is configured. Otherwise, the same fragment that was newly transmitted is neglected.

As described above, the DVB-H reception terminal can first acquire only optimal data required for a broadcast service and can significantly improve a reception scheme by acquiring ESG data based on a valid period rule in accordance with the first exemplary embodiment of the present invention.

Next, a process for acquiring ESG data on a service-by-service basis by reading a ServiceURI designated in each session in which the ESG data is carried in accordance with the second exemplary embodiment of the present invention will be described with reference to FIG. 6, which is a flowchart illustrating an operation of the DVB-H reception terminal when a ServiceURI rule is applied in accordance with the second exemplary embodiment of the present invention.

Figure 6:
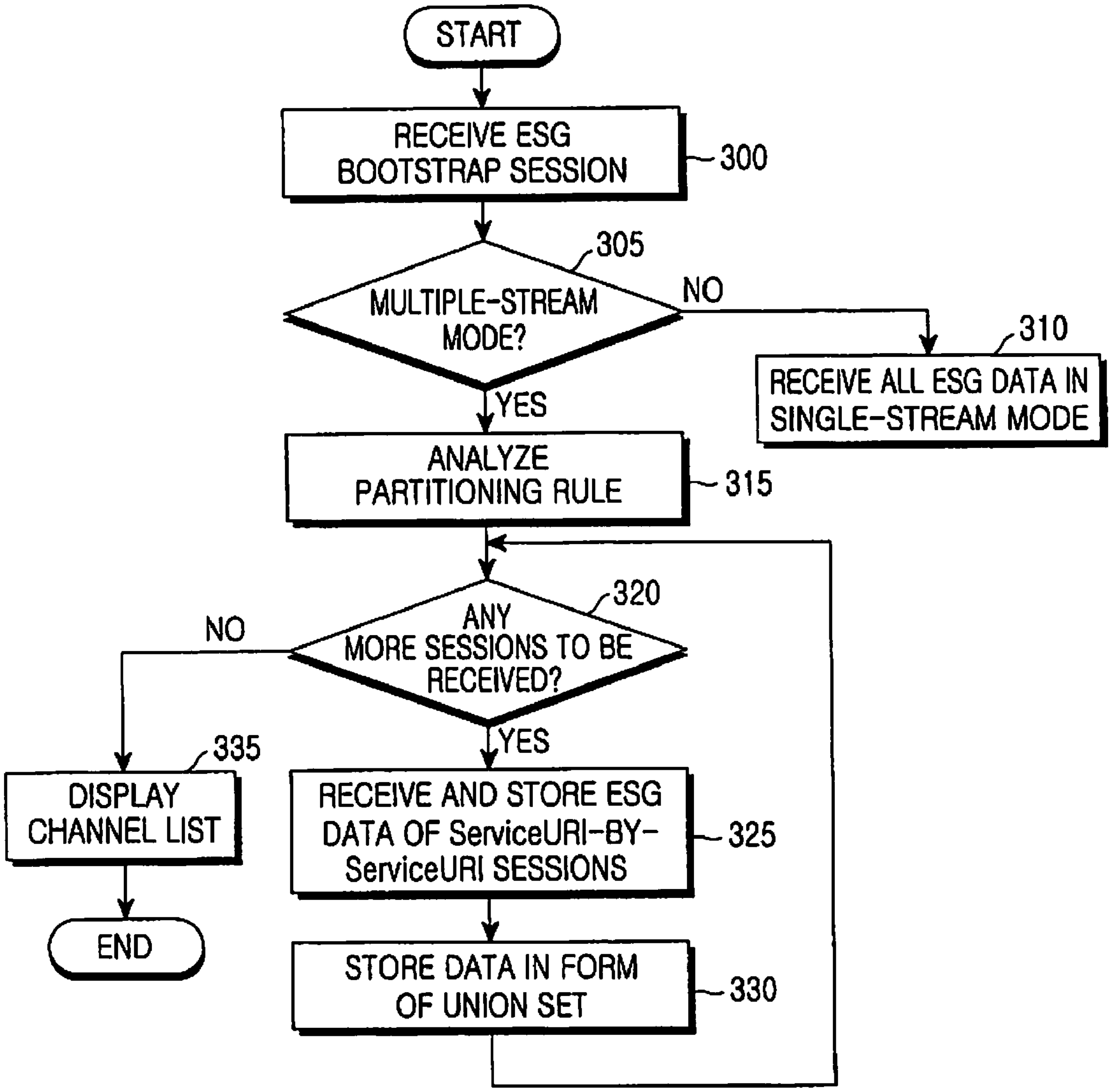
FIG. 6 is a flowchart illustrating an operation of the DVB-H reception terminal when a ServiceURI rule is applied in accordance with a second exemplary embodiment of the present invention.

Since the operations of steps 300 and 315 of FIG. 6 are substantially equal to those of steps 200 and 215 of FIG. 5, the detailed description is not repeated here.

Step 315 of analyzing a partitioning rule is different from step 215 in that the DVB-H reception terminal determines whether the ServiceURI rule is applied. Thus, the DVB-H reception terminal determines that the ServiceURI rule is applied when the "field identifier [k]" field 105 of FIG. 4 is set to a "0x01" value corresponding to the second value of Table 1. In regard to a data processing operation when the ServiceURI rule is applied in FIG. 6, it is assumed that the ServiceURI rule is applied.

If the ServiceURI rule is applied, the DVB-H reception terminal determines whether there are any more sessions to be received in step 320. Upon determining that there are more sessions to be received, the DVB-H reception terminal proceeds to step 325 to receive and store ESG data of ServiceURI-by-ServiceURI sessions. Then, the DVB-H reception terminal proceeds to step 330 to store data in the form of a union set and returns to step 320 to determine whether there are any more sessions to be received. If there are no more sessions to be received, the DVB-H reception terminal proceeds to step 335 to construct and display a channel list based on ESG data acquired up to now.

When receiving sessions to which the ServiceURI rule is applied in accordance with the second exemplary embodiment of the present invention as described above, the DVB-H reception terminal receives all sessions since data of all URIs is required to provide a broadcast service.

A process in which the DVB-H reception terminal performs an update to ESG data acquired from a session at the dateTime by reading the dateTime set in the session in which the ESG data is carried in accordance with the third exemplary embodiment of the present invention will be described with reference to the flowchart provided in FIG. 7.

Figure 7:
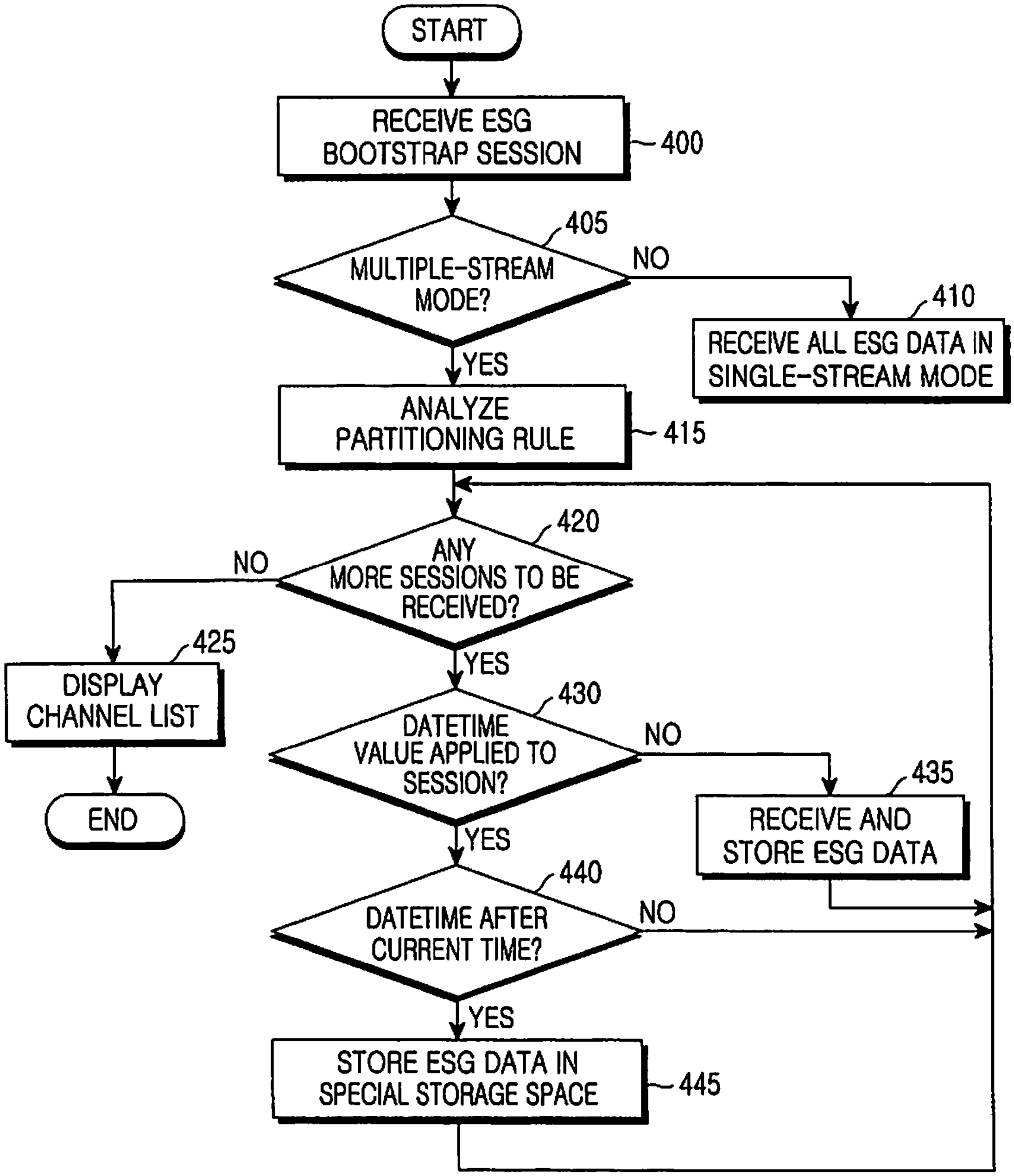
FIG. 7 is a flowchart illustrating an operation of the DVB-H reception terminal when a dateTime rule is applied in accordance with a third exemplary embodiment of the present invention.

Steps 400 to 415 of FIG. 7 are substantially equal to steps 200 to 215 of FIG. 5. In step 415 of FIG. 7, the DVB-H reception terminal analyzes a partitioning rule and determines whether the dateTime rule is applied. The dateTime rule is not defined in the DVB-H ESG standard. In an exemplary embodiment of the present invention, a dateTime is added to a rule available thereafter. Thus, the dateTime can be set to a value of "0x02-0xEF" corresponding to the third value of Table 1.

Upon determining that the dateTime rule is applied as a result of analyzing the partitioning rule, the DVB-H reception terminal determines whether there is a session to be received in step 420. The DVB-H reception terminal determines whether a dateTime value is applied to the associated session in step 430. Upon determining that a dateTime value is not applied to the session, the DVB-H reception terminal proceeds to step 435 to receive and store ESG data by immediately accessing a current session. When the dateTime value is applied to the session, the DVB-H reception terminal proceeds to step 440 to determine whether the dateTime is after the current time. If it is determined that the dateTime is not after the current time, the current session is regarded as an unnecessary session. The DVB-H reception terminal returns to step 420 to determine whether there is the next session to be received. The dateTime rule indicates that data of a session to which the associated rule is applied should be accurately applied to the DVB-H reception terminal at a time designated by the dateTime. If the designated time is not after the current time, it means that a time at which the associated session is applied to the DVB-H reception terminal has passed, such that ESG data is not received in the current session.

However, upon determining that the dateTime is after the current time in step 440, the DVB-H reception terminal proceeds to step 445 to store ESG data in a special storage space. The ESG data is stored to perform an update process at a time designated by the dateTime without immediately applying the ESG data to an application program even when the DVB-H reception terminal has already received the ESG data. When there are no more sessions to be received in the above-described process, the DVB-H reception terminal proceeds to step 425 to construct and display a channel list based on ESG data acquired up to now.

In the third exemplary embodiment of the present invention, there is an advantage in that the service provider designates desired ESG data and a desired time and enables all DVB-H reception terminals to simultaneously the ESG data when the ESG data to which the dateTime rule is applied is received.

An example in which one partitioning rule is applied to one session has been described. Alternatively, at least one rule can be applied to each session in a compound form. When a compound rule is applied, an operation process of the DVB-H reception terminal is as follows.

A compound rule capable of being defined in the current standard is a combination of a valid period and a ServiceURI. According to this combination, the operation of the DVB-H reception terminal is the same as described with reference to FIG. 5. That is, since all data mapped to all ServiceURIs should be received, the operation can be performed in a flow considering only a valid period rule and the ServiceURI does not need to be additionally considered.

On the other hand, there can be considered the case where both the valid period rule and the dateTime rule are applied. In this case, the DVB-H reception terminal first determines whether there is a session to which the dateTime rule is applied. Then, the DVB-H reception terminal stores ESG data of the session to which the dateTime rule is applied in a special storage space, and then performs an update process when a time designated by the dateTime is reached. The update process is performed in a scheme based on the above-described union set. It is preferred that both the valid period rule and the dateTime rule are not simultaneously applied to one session if rule characteristics are considered. It is preferred that one of the valid period rule and the dateTime rule is applied along with the remaining ServiceURI rule.

When the ServiceURI rule and the dateTime rule are simultaneously applied, the DVB-H reception terminal first detects only a session to which the dateTime rule is applied, acquires ESG data from the session, stores the acquired ESG data in a special storage space, and performs an update process at a time designated by a dateTime.

As described above, the present invention can significantly improve a reception scheme of a DVB-H reception terminal since ESG data can be efficiently received by providing detailed guidelines for receiving the ESG data based on a session partitioning rule.

In accordance with exemplary embodiments of the present invention, reception guidelines for a DVB-H reception terminal are provided according to session partitioning rule in a DVB-H broadcast service, such that confusion in implementing a reception operation of the DVB-H reception terminal can be minimized even when one partitioning rule or a compound rule based on two partitioning rules is present. In accordance with exemplary embodiments of the present invention, the DVB-H reception terminal can perform various functions using a partitioning rule.

While the invention has been shown and described with reference to certain exemplary embodiments thereof, it will be understood by those skilled in the art that various changes in form and details may be made therein without departing from the spirit and scope of the present invention, as defined by the appended claims and their equivalents.

What is claimed is:

1. A method for receiving Electronic Service Guide (ESG) data based on a session partitioning rule in a reception terminal, the method comprising:

receiving and decoding an ESG bootstrap session;

detecting a position of an ESG announcement carousel session from the ESG bootstrap session when an operating mode is an ESG multiple-stream mode as a decoding result;

reading a partitioning declaration from an initial container of the ESG announcement carousel session in the detected position;

analyzing a partitioning rule in the partitioning declaration, to acquire on which session ESG data is carried;

detecting a type of rule applied to each session upon determining that the partitioning rule is applied; and acquiring ESG data from each session based on the detected type of rule, wherein the partitioning declaration includes a field indicating a start field value or an end field value, and the start field value or the end field value is used for determining whether the partitioning rule is applied or not wherein a minimum value of the start field value and a maximum value of the end field value can be assigned as specific bit strings.

2. The method of claim 1, wherein the partitioning rules are applied independently or simultaneously when there is more than one partitioning rule.

3. The method of claim 1, further comprising:

identifying a time period to which an ESG data session is relevant, when the detected rule is a time period rule;

selecting the ESG data session according to identified time period;

acquiring ESG data from the ESG data session; and constructing and displaying a channel list based on the acquired ESG data.

4. The method of claim 3, wherein acquiring comprises:

acquiring ESG data in ascending order of scheduled end times of valid periods of sessions.

5. The method of claim 3, wherein acquiring comprises:

acquiring ESG data in ascending order of start times of valid periods of sessions.

6. The method of claim 3, wherein acquiring ESG data comprises:

comparing a fragment identifier (ID) of already stored ESG data with a fragment ID of ESG data of a new session;

comparing versions when an identical ID is present; and deleting a fragment of the already stored ESG data when a fragment version of the new session is higher and storing the ESG data of the new session.

7. The method of claim 1, wherein analyzing the partitioning rule comprises:

analyzing a length value of a field indicating the applied rule and a length value of an actual field.

8. The method of claim 1, further comprising:

acquiring ESG data of sessions according to service uniform resource identifiers (URIs) when the detected rule is a service URI rule.

9. The method of claim 1, further comprising:

reading a dateTime of each session when the detected rule is a dateTime rule;

determining whether the dateTime applied to each session is after a current time according to a reading result;

acquiring ESG data from a session whose dateTime is after the current time according to a determination result; and storing the acquired ESG data in a storage area to update previously stored ESG data when a time designated by the dateTime is reached.

10. The method of claim 1, further comprising:

determining whether a compound rule is applied to each session;

detecting a session to which a dateTime rule is applied upon determining that the dateTime rule and a service Uniform Resource Identifier (URI) rule are applied;

acquiring and storing ESG data from all sessions to which a dateTime is not applied; and acquiring ESG data from a session whose dateTime is after the current time to update previously stored ESG data when a time designated by the datetime is reached and storing the acquired ESG data in a storage area.

11. A reception terminal for receiving Electronic Service Guide (ESG) data based on a session partitioning rule, comprising:

a digital broadcasting receiver for receiving each ESG data session from a transmission server in a multiple-stream mode; and a controller for detecting a position of an ESG announcement carousel session from an ESG bootstrap session when an operating mode is an ESG multiple-stream mode as a decoding result, reading a partitioning declaration from an initial container of the ESG announcement carousel session in the detected position, analyzing a partitioning rule in the partitioning declaration, to acquire on which session ESG data is carried, detecting a type of rule applied to each session upon determining that the partitioning rule is applied, and acquiring ESG data from each session based on the detected rule, wherein the partitioning declaration comprises a field indicating a start field value or an end field value, and the start field value or the end field value is used for determining whether the partitioning rule is applied or not wherein a minimum value of the start field value and a maximum value of the end field value can be assigned as specific bit strings.

12. The reception terminal of claim 11, wherein the controller identifies a time period to which an ESG data session is relevant, when the detected rule is a time period rule, selecting the ESG data session according to identified time period, acquiring ESG data from the ESG data session, and constructing and displaying a channel list based on the acquired ESG data.

13. The reception terminal of claim 11, wherein the controller acquires ESG data of sessions according to service Uniform Resource Identifiers (URIs) when the detected rule is a service URI rule.

14. The reception terminal of claim 11, wherein the controller reads a dateTime of each session when the detected rule is a dateTime rule, determines whether the dateTime applied to each session is after a current time according to a reading result, acquires ESG data from a session whose dateTime is after the current time according to a determination result, and stores the acquired ESG data in a storage area to update ESG data previously stored in the memory when a time designated by the dateTime is reached.

15. The reception terminal of claim 11, wherein the controller determines whether a compound rule is applied to each session, detects a session to which a dateTime rule is applied upon determining that the dateTime rule and a service Uniform Resource Identifier (URI) rule are applied, acquires and stores ESG data from all sessions to which a dateTime is not applied, acquires ESG data from a session whose dateTime is after the current time to update ESG data previously stored in the memory when a time designated by the dateTime is reached, and stores the acquired ESG data in a storage area of the memory.

16. The method of claim 7, wherein analyzing the partitioning rule in the partitioning declaration further comprises;

determining whether the rule in the associated session is used according to a value of an overlapping field included in the partitioning declaration.

17. The method of claim 16, wherein analyzing the partitioning rule in the partitioning declaration further comprises:

determining the rule of the associated session is not used, if the start field value and the end field value are assigned as predefined bit strings irrespective of the value of the overlapping field.

18. The method of claim 17, wherein the assigning of the bit strings is applied when the value of the field is variable or fixed.

19. The method of claim 1, wherein the partitioning declaration further comprises at least one of a field for identifying which partitioning rule is applied to the session, and a field for indicating whether the partitioning rule is overlapped or not.

20. The method of claim 1, wherein the start field value is set to "0×00" or "a" and the end field value is set to "0×FF" or "z" when the rule is not applied.

21. The reception terminal of claim 11, wherein the partitioning rules are applied independently or simultaneously to each session when there are more than one partitioning rule.

22. The reception terminal of claim 11, wherein the partitioning declaration further comprises at least one of a field for identifying which partitioning rule is applied to the session, and a field for indicating whether the partitioning rule is overlapped or not.

23. The reception terminal of claim 11, wherein the start field value is set to "0×00" or "a" and the end field value is set to "0×FF" or "z" when the rule is not applied.

* * * * *